(12) United States Patent
Naito et al.

(10) Patent No.: US 11,629,158 B2
(45) Date of Patent: Apr. 18, 2023

(54) METHOD FOR PRODUCING CYCLIC POLYSILANE COMPOUND

(71) Applicant: Kureha Corporation, Tokyo (JP)

(72) Inventors: Ryota Naito, Tokyo (JP); Hiraku Tohmiya, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 0 days.

(21) Appl. No.: 16/978,872

(22) PCT Filed: Mar. 7, 2019

(86) PCT No.: PCT/JP2019/009019
§ 371 (c)(1),
(2) Date: Sep. 8, 2020

(87) PCT Pub. No.: WO2019/176704
PCT Pub. Date: Sep. 19, 2019

(65) Prior Publication Data
US 2020/0407379 A1 Dec. 31, 2020

(30) Foreign Application Priority Data
Mar. 15, 2018 (JP) .............................. JP2018-048207

(51) Int. Cl.
*C07F 7/21* (2006.01)
*C08G 77/60* (2006.01)

(52) U.S. Cl.
CPC ............... *C07F 7/21* (2013.01); *C08G 77/60* (2013.01)

(58) Field of Classification Search
None
See application file for complete search history.

(56) References Cited

U.S. PATENT DOCUMENTS

| | | | |
|---|---|---|---|
| 5,237,033 A | 8/1993 | Tabei et al. | |
| 5,283,044 A | 2/1994 | Okamura et al. | |

FOREIGN PATENT DOCUMENTS

| | | |
|---|---|---|
| JP | S54-24874 A | 2/1979 |
| JP | S54-130541 A | 10/1979 |
| JP | H04-194028 A | 7/1992 |
| JP | H4-288333 A | 10/1992 |
| JP | 2017-57310 A | 3/2017 |
| WO | 2017/179369 A1 | 10/2017 |

OTHER PUBLICATIONS

Metallic Sodium Dispersions, downloaded Jul. 2, 2022, https://www.spxflow.com/assets/pdf/apv-homogenizer-sodium-dispersions-processing-us.pdf.*
Office Action dated Jan. 18, 2022, in Japanese Patent Application No. 2018-048207.
International Search Report of the International Searching Authority for PCT/JP2019/009019 dated May 28, 2019.
English translation of International Search Report of the International Searching Authority for PCT/JP2019/009019 dated May 28, 2019.
Extended European Search Report dated Mar. 19, 2021, in European Patent Application No. 19768654.6.
Lange et al., "Synthesis of Cycloalkyl Substituted Cyclotetrasilanes," Main Group Metal Chemistry (2002), vol. 25, No. 3, pp. 155-162.
Office Action dated Aug. 17, 2021, in JP 2018-048207.
International Preliminary Report on Patentability and English translation of the Written Opinion of the International Searching Authority for International Application No. PCT/JP2019/009019, dated Sep. 24, 2020.
Office Action dated Oct. 28, 2022, in Chinese Patent Application No. 201980013239.3.
Office Action dated Jan. 19, 2023, in Chinese Patent Application No. 201980013239.3.

* cited by examiner

*Primary Examiner* — Clinton A Brooks
(74) *Attorney, Agent, or Firm* — Birch, Stewart, Kolasch & Birch, LLP

(57) ABSTRACT

Provided is a method for producing a cyclic polysilane compound from a silane monomer compound in one-pot approach. The method for producing a cyclic polysilane compound according to an embodiment of the present invention includes a first step of adding and reacting a silane monomer compound in a liquid mixture of a sodium dispersion and a solvent; and a second step of adding an aromatic hydrocarbon to a reaction solution of the first step and heating and refluxing.

7 Claims, No Drawings

METHOD FOR PRODUCING CYCLIC POLYSILANE COMPOUND

TECHNICAL FIELD

The present invention relates to a method for producing a cyclic polysilane compound.

BACKGROUND ART

Silicon carbide fibers are fibers having excellent heat resistance and oxidation resistance even in high temperature atmosphere at a thousand and several hundreds degrees. This property is expected to be applied in the nuclear and aerospace fields.

The silicon carbide fibers can be obtained by subjecting an organosilicon polymer compound such as polycarbosilane, which is a precursor, to spinning, infusibilization, and firing. To obtain silicon carbide fibers having extreme heat resistance, introduction of oxygen atom into the polymer compound constituting the fibers needs to be inhibited. Therefore, silicon carbide fibers having extreme heat resistance are produced by using an organosilicon polymer compound having a low oxygen content and, for infusibilization, by employing a method that does not introduce oxygen. Cyclic polysilane compounds, such as dodecamethylcyclohexasilane, can provide polycarbosilane with approximately 0.1 wt % of oxygen content, and thus is useful as a raw material for organosilicon polymer compound, which serves as a precursor of silicon carbide fibers (Patent Document 1).

As a method for producing dodecamethylcyclohexasilane, Patent Document 2 describes the following method: at first, xylene and metallic sodium are heated and refluxed, dichlorodimethylsilane is added dropwise, and polydimethylsilane is obtained; and then, the purified polydimethylsilane, a dispersion of metallic sodium in naphthalene, and tetrahydrofuran (THF) are mixed under stirring at room temperature, then heated and refluxed under stirring, and then cooled to room temperature, after which ethanol is added thereto.

Furthermore, as a method for producing a polysilane compound, Patent Document 3 describes a method including a first step of synthesizing a polysilane compound by adding one of a dispersion, in which an alkali metal is dispersed in an inert solvent, or a monomer to a reaction solution containing the other of the dispersion or the monomer; and a second step of deactivating the alkali metal by reacting the reaction solution in which the polysilane compound is synthesized and a deactivation solution including alcohol and water.

CITATION LIST

Patent Document

Patent Document 1: JP 04-194028 A (published on Jul. 14, 1992)

Patent Document 2: JP 54-130541 A (published on Oct. 9, 1979)

Patent Document 3: JP 2017-57310 A (published on Mar. 23, 2017)

SUMMARY OF INVENTION

Technical Problem

The technology described in Patent Document 2 includes a purification operation to remove the solvent (xylene) from the synthesized polydimethylsilane and has a problem that the operation is complicated. Furthermore, in the technology described in Patent Document 3, since the alkali metal is deactivated by adding the deactivation solution including alcohol and water, the purification operation is required to remove alcohol and water in order to further obtain dodecamethylcyclohexasilane from the obtained polysilane compound, and thus there is a problem of the complicated operation as well.

An aspect of the present invention is to provide a method for producing a cyclic polysilane compound from a silane monomer compound in one-pot approach.

Solution to Problem

To solve the problems described above, a method for producing a cyclic polysilane compound according to an aspect of the present invention includes a first step of adding and reacting a silane monomer compound in a liquid mixture of a sodium dispersion and a solvent; and a second step of adding an aromatic hydrocarbon to a reaction solution of the first step and heating and refluxing.

Advantageous Effects of Invention

According to an aspect of the present invention, a cyclic polysilane compound can be produced from a silane monomer compound in one-pot approach.

DESCRIPTION OF EMBODIMENTS

Outline

The method for producing a cyclic polysilane compound according to an embodiment of the present invention includes a first step of adding and reacting a silane monomer compound represented by Formula (I) below in a liquid mixture of a sodium dispersion and a solvent; and a second step of adding an aromatic hydrocarbon to a reaction solution of the first step and heating and refluxing.

[Chemical Formula 1]

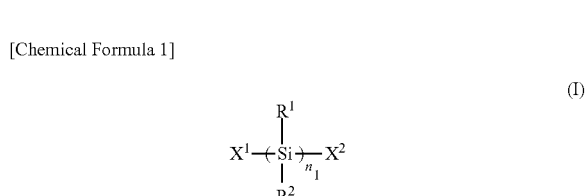

$R^1$ and $R^2$ each independently represent a hydrogen atom, a hydrocarbon group, an alkoxy group, or a halogen atom. $X^1$ and $X^2$ each independently represent an alkoxy group or a halogen atom $n_1$ is an integer that is greater than or equal to 1⊖.

Examples of the alkoxy group in $R^1$ and $R^2$ as well as $X^1$ and $X^2$ include a methoxy group and an ethoxy group. Examples of the halogen atom include a fluorine atom, a chlorine atom, a bromine atom, and an iodine atom. These have a large electronegativity difference from silicon, leading to intramolecular polarization in the silane monomer compound, and thus have excellent reactivity and are substituents that function as leaving groups in reactions. As such a substituent, from the perspectives of stability and stable supply of the silane monomer compound itself, a halogen atom is preferred, and a chlorine atom is more preferred. The number of the alkoxy groups or the halogen atoms in the silane monomer compound is two or more (such as two, three, or four); however, from the perspective of forming a cyclic polysilane compound without branch, the number of the alkoxy groups or the halogen atoms in the silane monomer compound is preferably two ($X^1$ and $X^2$). Such two or more alkoxy groups or halogen atoms in one silane monomer compound may be the same or different.

Examples of the hydrocarbon group in $R^1$ and $R^2$ include alkyl groups, alkenyl groups, alkynyl groups, and aryl groups.

$R^1$ and $R^2$ can be a side chain in a chain polysilane compound and can be a side chain in a cyclic polysilane compound. Therefore, $R^1$ and $R^2$ in the silane monomer compound can be selected depending on the cyclic polysilane compound which is the synthesis target. In one embodiment, $R^1$ and $R^2$ are preferably a hydrogen atom or a hydrocarbon group, more preferably a hydrocarbon group, even more preferably an alkyl group, and particularly preferably a methyl group.

$n_1$ is an integer that is greater than or equal to 1, and not greater than the number of silicon in the cyclic polysilane compound which is the synthesis target. $n_1$ can be, for example, 1, 2, 3, 4, 5, 6, 7, 8, 9, 10 or greater. From the perspectives of stability of the silane monomer compound itself and enhancing reactivity of silane monomer compounds, $n_1$ is preferably 1 or 2, and more preferably 1.

In one embodiment, for the silane monomer compound, in Formula (I), $R^1$ and $R^2$ each independently represent a hydrogen atom or a hydrocarbon group, $X^1$ and $X^2$ each independently represent a halogen atom, and $n_1$ is preferably an integer greater than or equal to 1.

The silane monomer compound in the first step may be one type or a mixture of two or more types.

One characteristic of the present embodiment is that, by using a sodium dispersion, the cyclic polysilane compound, which is the target product, is produced from a silane monomer compound, which is a raw material, in one-pot approach.

In the first step, a cyclic polysilane compound and a chain polysilane compound are formed from a silane monomer compound. In the second step, the chain polysilane compound is converted into a cyclic polysilane compound.

First Step

A silane monomer compound is added and reacted in a liquid mixture of a sodium dispersion and a solvent.

The sodium dispersion (SD) in the present specification is a dispersion, in which metallic sodium having an average particle diameter from 1 μm to 30 μm is dispersed in an electrical insulating oil. From the perspectives of reactivity and safety, the average particle diameter is preferably from 2 μm to 10 μm, and more preferably from 3 μm to 5 μm. Examples of the electrical insulating oil include aliphatic hydrocarbons such as liquid paraffin. The amount of the metallic sodium in the sodium dispersion is not particularly limited but is preferably from 20 to 30 wt % from the perspective of safety.

The solvent mixed with the sodium dispersion is a liquid that allows metallic sodium having an average particle diameter from 1 μm to 30 μm to be dispersed, and examples include aprotic polar solvents. In particular, an ether solvent that does not react with metallic sodium is preferred. Examples of the ether solvent include tetrahydrofuran (THF), 1,2-dimethoxyethane, 4-methyltetrahydropyran, bis(2-methoxyethyl)ether, 1,4-dioxane, and cyclopentyl methyl ether. These solvents may be used alone, or a mixture of two or more types of these may be used. The solvent is preferably a solvent that is suitable for a reaction to obtain a cyclic polysilane compound from a chain polysilane compound, aromatic hydrocarbon and sodium. In the present embodiment, since metallic sodium is not required to be melted in the first step, a solvent having a boiling point of lower than 90° C., lower than 85° C., lower than 80° C., lower than 75° C., or lower than 70° C. can be selected. As the solvent, tetrahydrofuran, 4-methyltetrahydropyran, and cyclopentyl methyl ether, which do not inhibit reaction in the second step, are preferred, and tetrahydrofuran is more preferred.

The amount of the solvent in the liquid mixture is not particularly limited; however, from the perspective of inhibition of formation of chain polysilane compounds, the amount is preferably from 5 to 50 mL, and more preferably from 10 to 40 mL, per 1 g of metallic sodium.

The temperature during preparation of the liquid mixture is not particularly limited; however, the mixing and stirring are preferably performed at 0° C. to room temperature (23° C. to 27° C.).

In the first step, the silane monomer compound is added to the liquid mixture of the sodium dispersion and the solvent. Thereby, local increase in concentration of the silane monomer compounds during the addition can be reduced. Therefore, since the proportion of the reaction that produces cyclic polysilane compounds, not through chain polysilane compounds, increases compared to the reaction that produces chain polysilane compounds in the first step, the total yield of the cyclic polysilane compound after the second step is increased.

The silane monomer compound may be added alone or as a mixture with a solvent. In one embodiment, since the silane monomer compound is liquid at room temperature, the silane monomer compound can be mixed with a solvent. Examples of the solvent include aprotic polar solvents. Examples of the aprotic polar solvent include tetrahydrofuran (THF), 1,2-dimethoxyethane, 4-methyltetrahydropyran, bis(2-methoxyethyl)ether, 1,4-dioxane, and cyclopentyl methyl ether. These solvents may be used alone, or a mixture of two or more types of these may be used. The solvent is preferably a solvent that is suitable for a reaction to obtain a cyclic polysilane compound from a chain polysilane compound and aromatic hydrocarbon. In the present embodiment, since metallic sodium is not required to be melted in the first step, a solvent having a boiling point of lower than 90° C., lower than 85° C., lower than 80° C., lower than 75° C., or lower than 70° C. can be selected. As the solvent, tetrahydrofuran, 4-methyltetrahydropyran, and cyclopentyl methyl ether, which do not inhibit reaction in the second step, are preferred, and tetrahydrofuran is more preferred. In the case where the silane monomer compound to be added is mixed with the solvent, local increase in concentration of the silane monomer compounds during the addition can be reduced. Therefore, since the proportion of the reaction that produces cyclic polysilane compounds, not through chain polysilane compounds, increases compared to the reaction that produces chain polysilane compounds in the first step, the total yield of the cyclic polysilane compound after the second step is increased.

Furthermore, from the perspective of easier purification that can be performed after the second step, the solvent in the liquid mixture of the sodium dispersion and the solvent, and the solvent in the silane monomer compound are preferably the same one.

In the case where the silane monomer compound is mixed with the solvent, the amount of the solvent is not particularly limited; however, from the perspective of the inhibition of formation of chain polycarbosilane, the amount is preferably from 1 to 50 mL, and more preferably from 5 to 20 mL, per 1 g of the silane monomer compound.

The ratio of the amount of the metallic sodium contained in the sodium dispersion to the amount of the silane monomer compound is not particularly limited. However, from the perspective of the yield of the cyclic polysilane compound, the amount of the metallic sodium is preferably 1.25 molar equivalents or greater, more preferably 1.50 molar equivalents or greater, and even more preferably 2.5 molar equivalents or greater, per one functional group of the alkoxy group or the halogen atom of the silane monomer compound. Furthermore, from the perspective of post-treatment of reaction, the amount of the metallic sodium is preferably 3 molar equivalents or less per one functional group of the alkoxy group or the halogen atom of the silane monomer compound.

The preparation temperature of the liquid mixture of the silane monomer compound and the solvent is not particularly limited; however, the mixing and stirring are preferably performed at 0° C. to room temperature.

The silane monomer compound is preferably added in batches, and more preferably added dropwise. Thereby, local increase in concentration of the silane monomer compounds can be reduced, and thus formation of chain polysilane compound can be inhibited. Therefore, the proportion of the reaction that produces cyclic polysilane compounds, not through chain polysilane compounds, increases in the first step, and the total yield of the cyclic polysilane compound after the second step is increased.

During the addition of the silane monomer compound in the liquid mixture of the sodium dispersion and the solvent, the temperature of the liquid mixture is preferably −10° C. or higher, and more preferably −5° C. or higher, and preferably lower than a reflux temperature, more preferably lower than 50° C., even more preferably lower than 45° C., yet even more preferably lower than 40° C., yet even more preferably lower than 35° C., yet even more preferably lower than 30° C., and yet even more preferably lower than 25° C.; and from the perspective of the suppression of heat generation, the temperature is more preferably room temperature or lower, even more preferably lower than 20° C., yet even more preferably lower than 15° C., yet even more preferably lower than 10° C., and yet even more preferably lower than 5° C. In one embodiment, the temperature of the liquid mixture is 0° C. Note that "reflux temperature of liquid mixture" refers to a "temperature at which reflux starts if the liquid mixture is slowly heated". Thus, "lower than a reflux temperature" refers to "lower than a lower limit temperature at which reflux can occur"

The duration for addition of the silane monomer compound into the liquid mixture is not particularly limited and can be appropriately set depending on, for example, the entire volume. For example, the duration is preferably from 5 to 15 minutes, and more preferably from 9 to 12 minutes, per 1 mL of the liquid mixture.

The temperature is preferably increased after the addition of the silane monomer compound. That is, in the first step, the silane monomer compound is added during a period of time when the liquid mixture is at a first temperature, and after completion of the addition of the silane monomer compound, reaction is preferably continued at a second temperature, which is higher than the first temperature. Thereby, the yield of the cyclic polysilane compound in the first step is increased. It is conceived that this is because heat generation and excessive reaction during the addition can be inhibited and progression of the reaction after the addition can be accelerated. Note that the first temperature is a temperature of the liquid mixture during the addition of the silane monomer compound into the liquid mixture described above.

The second temperature is preferably 0° C. or higher, more preferably 5° C. or higher, and preferably lower than the reflux temperature. For example, the temperature of the liquid mixture is room temperature.

The reaction time at the second temperature is not particularly limited and can be appropriately set depending on, for example, the entire volume. For example, the time is preferably from 3 to 25 hours.

The reaction in the first step is preferably performed under stirring from the perspective of reducing local increase in the concentration.

In the first step, a cyclic polysilane compound and a chain polysilane compound can be formed from a silane monomer compound.

The chain polysilane compound is a compound having a straight chain structure or a branched structure having a main chain and a side chain, which was polymerized from a silane monomer compound as raw material. The chain polysilane compound formed in the present embodiment is, for example, represented by the following formula.

[Chemical Formula 2]

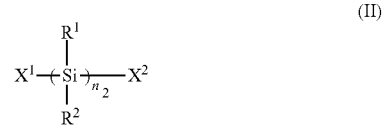

(II)

$R^1$ and $R^2$ are the same as those of $R^1$ and $R^2$ in the raw material silane monomer compound, and $X^1$ and $X^2$ are the same as those of $X^1$ and $X^2$ in the raw material silane monomer compound $n_2$ is an integer that is greater than or equal to 2.

The cyclic polysilane compound is a compound in which the raw material silane monomer compound is polymerized in a cyclic or polycyclic form, and may have a side chain of silane or organic silane. The cyclic polysilane compound formed in the present embodiment is, for example, represented by the following formula.

[Chemical Formula 3]

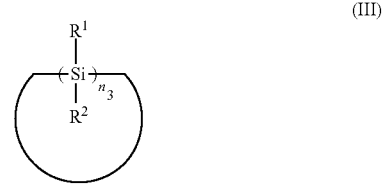

(III)

$R^1$ and $R^2$ are the same as those of $R^1$ and $R^2$ in the raw material silane monomer compound $n_3$ is an integer that is greater than or equal to 3. $n_3$ can be, for example, 3, 4, 5, 6, 7, 8, 9, 10 or greater. In one embodiment, $n_3$ is preferably 6.

Note that, in the case where $R^1$ or $R^2$ of the raw material silane monomer compound is a halogen atom or an alkoxy group, a cyclic or polycyclic polysilane compound having a side chain may be obtained.

In the present embodiment, no purification is performed between the first step and the second step.

Second Step

In the second step, an aromatic hydrocarbon is added to the reaction solution of the first step, and heated and refluxed.

Examples of the aromatic hydrocarbon include naphthalene and anthracene. As the aromatic hydrocarbon, naphthalene is preferred from the perspective of the easier purification and isolation operation for the cyclic polysilane compound after the reaction. The aromatic hydrocarbon may be one type or a mixture of two or more types.

The amount of the aromatic hydrocarbon is not particularly limited; however, the aromatic hydrocarbon is preferably 0.1 molar equivalents or greater, and more preferably 0.2 molar equivalents or greater, relative to the amount of the silane monomer compound from the perspective of yield of the cyclic polysilane compound, and is preferably 1.0 molar equivalent or less relative to the amount of the silane monomer compound from the perspectives of heat generation in the reaction and isolation after the reaction.

The reaction temperature in the second step is not particularly limited as long as the reaction temperature is a temperature that allows reflux of the reaction solution and may be selected depending on the solvent. For example, in the case where the solvent is tetrahydrofuran, the temperature is preferably from 60 to 70° C. Note that the addition may be performed at a temperature lower than the reflux temperature (e.g., room temperature).

The reaction time in the second step is not particularly limited and can be appropriately set depending on, for example, the entire volume. For example, the time is preferably from 1 to 8 hours, and more preferably from 3 to 8 hours.

The reaction in the second step is preferably performed under stirring from the perspective of reducing local increase in the concentration.

In the present embodiment, without purification of the reaction solution of the first step (without isolation of the product), the aromatic hydrocarbon is added to the reaction solution of the first step. Therefore, the metallic sodium and the solvent necessary for the reaction in the second step are taken over the first step. Therefore, it is inexpensive and environmentally friendly.

In the second step, the cyclic polysilane compound is formed from the chain polysilane compound formed in the first step. The cyclic polysilane compound formed in the present embodiment is as described for the first step. By performing the second step in this manner, the total yield of the cyclic polysilane compound can be increased.

The cyclic polysilane compound after the second step may be obtained as the reaction solution as is, may be subjected to a post-treatment to be obtained as a solution, or may be subjected to an isolation operation to be obtained as a simple substance. Examples of the isolation operation include crystallization operations, distillation operations, and sublimation operations. The isolation operation may be one type of these or a combination of two or more types of these.

Comparison Between Production Method in the Art and Production Method of the Present Embodiment To understand further the present embodiment, an example of production methods in the art and an example of the production method of the present embodiment are compared and described. Note that, as an example, a case where dodecamethylcyclohexasilane (cyclic polysilane compound) is produced from dichlorodimethylsilane (silane monomer compound) is described; however, the present embodiment is not limited to this. Furthermore, solvents, temperature conditions, and the like are also examples, and the present embodiment is not limited to these.

[Chemical Formula 4]

Production method in the art

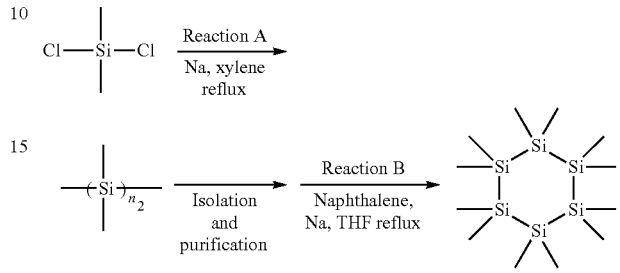

Production method in the present embodiment

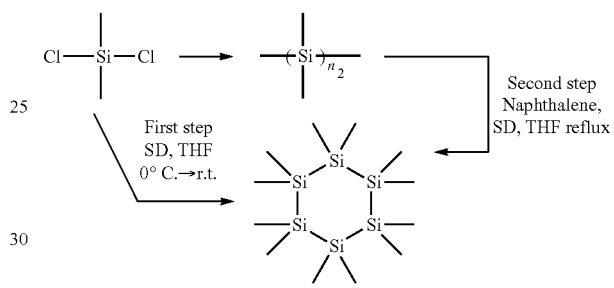

Production method in the art

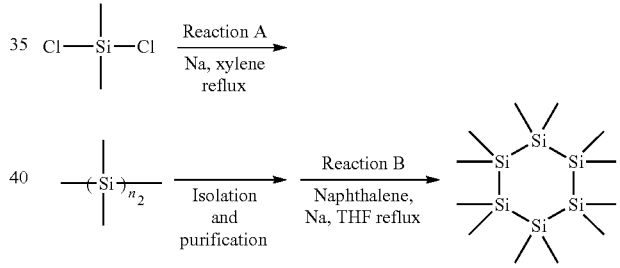

Production method in the present embodiment

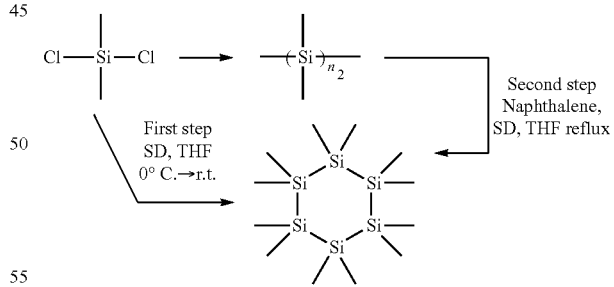

In an example of a production method in the art, at first, metallic sodium and xylene are heated and refluxed, then dichlorodimethylsilane is added dropwise, and thus polydimethylsilane is obtained (reaction A). Then, the obtained polydimethylsilane is isolated and purified. Then, the purified polydimethylsilane, THF, and a dispersion of metallic sodium in naphthalene are mixed under stirring at room temperature, and then heated and refluxed under stirring. Therefore, the dodecamethylcyclohexasilane is obtained (reaction B). Note that, in the reaction B, the xylene used in the reaction A cannot be used as a solvent in place of the THF from the perspective of solvent dependence of the reaction. On the other hand, in the reaction A, the temperature needs to be increased to melt the metallic sodium; however, since the boiling point of the THF is lower than the melting point of the metallic sodium, the THF used in the reaction B cannot be used as a solvent in place of xylene. Therefore, in the production method in the art, different solvents need to be employed for the reaction A and the reaction B, and isolation and purification need to be performed after polydimethylsilane, which is an intermediate product, is obtained. Therefore, the production method in the art cannot be performed in one-pot approach, and the operation is complicated.

In an example of the production method according to the present embodiment, at first, reaction is performed at a temperature lower than the reflux temperature by using a sodium dispersion (SD) to obtain polydimethylsilane and dodecamethylcyclohexasilane (the first step). Then, naphthalene is added to the reaction solution and heated and refluxed to convert the polydimethylsilane into the dodecamethylcyclohexasilane (the second step). Note that, in the first step, the temperature does not need to be increased to the melting temperature of the metallic sodium because the sodium dispersion is used. Furthermore, since the temperature does not need to be increased, the THF can be used. Therefore, the same solvent can be used in the first step and the second step. That is, without performing isolation and purification, a cyclic polysilane compound can be produced from a silane monomer compound in one-pot approach. Therefore, compared to production method in the art, the operation is simple and easy. Furthermore, since the metallic sodium and the solvent, which are necessary for the reaction, can be commonly used in the two steps (the first step and the second step), it is inexpensive and environmentally friendly. Furthermore, dodecamethylcyclohexasilane is obtained in the first step, and by further performing the second step, the dodecamethylcyclohexasilane can be further obtained from the polydimethylsilane formed in the first step. Therefore, the total yield can be excellent.

SUMMARY

As described above, the method for producing a cyclic polysilane compound according to an aspect of the present invention includes a first step of adding and reacting a silane monomer compound represented by Formula (I) below in a liquid mixture of a sodium dispersion and a solvent; and a second step of adding an aromatic hydrocarbon to a reaction solution of the first step and heating and refluxing.

[Chemical Formula 5]

(I)

In the formula, $R^1$ and $R^2$ each independently represent a hydrogen atom, a hydrocarbon group, an alkoxy group, or a halogen atom, $X^1$ and $X^2$ each independently represent an alkoxy group or a halogen atom. $n_1$ is an integer that is greater than or equal to 1.

In the method for producing a cyclic polysilane compound according to one aspect of the present invention, the silane monomer compound is preferably added in batches.

In the method for producing a cyclic polysilane compound according to one aspect of the present invention, temperatures of the liquid mixture and the reaction solution are preferably −10° C. or higher and lower than a reflux temperature.

In the method for producing a cyclic polysilane compound according to one aspect of the present invention, in the first step, the silane monomer compound is preferably added during a period of time when the liquid mixture is at a first temperature, and after completion of the addition of the silane monomer compound, reaction is preferably continued at a second temperature, which is higher than the first temperature.

In the method for producing a cyclic polysilane compound according to one aspect of the present invention, the sodium dispersion is preferably a dispersion, in which metallic sodium having an average particle diameter from 1 µm to 30 µm is dispersed in an electrical insulating oil.

In the method for producing a cyclic polysilane compound according to one aspect of the present invention, the silane monomer compound to be added is preferably mixed with a solvent.

In the method for producing a cyclic polysilane compound according to one aspect of the present invention, the solvent in the liquid mixture and the solvent for the silane monomer compound are preferably the same solvent.

In the method for producing a cyclic polysilane compound according to one aspect of the present invention, the solvent in the liquid mixture is preferably an aprotic polar solvent.

In the method for producing a cyclic polysilane compound according to one aspect of the present invention, the aprotic polar solvent is preferably an ether solvent.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents described in the present specification are herein incorporated by reference.

EXAMPLES

Example 1

In a 200 mL four-necked flask, 30 mL of tetrahydrofuran and 11.07 g of sodium dispersion ("25 wt % sodium dispersion") were charged and stirred, and thus a liquid mixture was prepared. In 25 mL of tetrahydrofuran, 3.22 g of dichlorodimethylsilane was dissolved, and thus a silane monomer compound solution was prepared. The mixture was cooled and maintained at 0° C., and the silane monomer compound solution was added dropwise thereto over 5 hours under stirring. After completion of the dropwise addition, the mixture was stirred at room temperature for 3 hours and then allowed to react overnight (the first step). Then, 0.83 g of naphthalene was added thereto at room temperature and heated and refluxed for 4 hours under stirring (the second step). When the heating was stopped and the reaction solution was analyzed, formation of dodecamethylcyclohexasilane, which is a cyclic polysilane compound, was confirmed, and the yield was 87.3%.

Example 2

Dodecamethylcyclohexasilane was synthesized in the same manner as in Example 1 except for changing the amount of the sodium dispersion added to 8.86 g. The yield thereof was 83.4%.

Example 3

Dodecamethylcyclohexasilane was synthesized in the same manner as in Example 1 except for changing the amount of the sodium dispersion added to 5.88 g. The yield thereof was 71.6%.

The results of Examples 1 to 3 are shown in the following table. Note that "SD" in the table means a sodium dispersion.

TABLE 1

| | Amount of SD added (g) | Amount of sodium added per 1 substituent of leaving group (mol equivalent) | Yield (%) |
|---|---|---|---|
| Example 1 | 11.07 | 2.5 | 87.3 |
| Example 2 | 8.86 | 2.0 | 83.4 |
| Example 3 | 5.88 | 1.3 | 71.6 |

Reference Example 1

In a 200 mL four-necked flask, 30 mL of tetrahydrofuran and 5.88 g of sodium dispersion ("25 wt % sodium dispersion") were charged and stirred, and thus a liquid mixture was prepared. In 25 mL of tetrahydrofuran, 3.22 g of dichlorodimethylsilane was dissolved, and thus a silane monomer compound solution was prepared. The mixture was cooled and maintained at 0° C., and the silane monomer compound solution was added dropwise thereto over 5 hours under stirring. After completion of the dropwise addition, the mixture was stirred at room temperature for 3 hours and then allowed to react overnight at room temperature (the first step). When the reaction solution was analyzed, formation of dodecamethylcyclohexasilane, which is a cyclic polysilane compound, was confirmed, and the yield was 24.5%.

Reference Example 2

Dodecamethylcyclohexasilane, which is a cyclic polysilane compound, was obtained in the same manner as in Reference example 1 except for changing the temperature after completion of the dropwise addition of the silane monomer compound solution in the first step to 0° C. (which was at room temperature in Reference Example 1). The yield thereof was 20.8%.

Reference Example 3

Dodecamethylcyclohexasilane, which is a cyclic polysilane compound, was obtained in the same manner as in Reference example 1 except for changing the temperature after completion of the dropwise addition of the silane monomer compound solution in the first step to 55° C. The yield thereof was 28.9%.

Reference Example 4

Dodecamethylcyclohexasilane, which is a cyclic polysilane compound, was obtained in the same manner as in Reference example 1 except for changing the temperature during the preparation of the liquid mixture of the tetrahydrofuran and the sodium dispersion and the temperature during the dropwise addition of the silane monomer compound solution to the liquid mixture in the first step to 55° C. (both were 0° C. in Reference Example 1), and changing the temperature after completion of the dropwise addition of the silane monomer compound solution in the first step to 55° C. (which was at room temperature in Reference Example 1). The yield thereof was 23.0%.

INDUSTRIAL APPLICABILITY

The present invention can be advantageously utilized in production of a cyclic polysilane compound, which is a raw material for silicon carbide fibers that are expected to be applied in the nuclear and aerospace fields.

The invention claimed is:

1. A method for producing a cyclic polysilane compound comprising: a first step of adding and reacting a silane monomer compound represented by Formula (I) in a liquid mixture of a sodium dispersion and an ether-based solvent; and a second step of adding an aromatic hydrocarbon to a reaction solution of the first step and heating and refluxing, wherein the aromatic hydrocarbon is selected from naphthalene and anthracene:

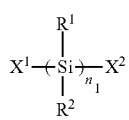
(I)

where, $R^1$ and $R^2$ each independently represent a hydrogen atom, a hydrocarbon group, an alkoxy group, or a halogen atom, $X^1$ and $X^2$ each independently represent a halogen atom or an alkoxy group, and $n_1$ is an integer that is greater than or equal to 1.

2. The method for producing a cyclic polysilane compound according to claim 1, wherein the silane monomer compound is added in batches.

3. The method for producing a cyclic polysilane compound according to claim 1, wherein temperatures of the liquid mixture and the reaction solution are −10° C. or higher, and lower than a reflux temperature.

4. The method for producing a cyclic polysilane compound according to claim 1, wherein, in the first step, the silane monomer compound is added during a period of time when the liquid mixture is at a first temperature, and after completion of the addition of the silane monomer compound, reaction is continued at a second temperature, which is higher than the first temperature.

5. The method for producing a cyclic polysilane compound according to claim 1, wherein the sodium dispersion is a dispersion, in which metallic sodium having an average particle diameter from 1 μm to 30 μm is dispersed in an electrical insulating oil.

6. The method for producing a cyclic polysilane compound according to claim 1, wherein the silane monomer compound to be added is mixed with a solvent.

7. The method for producing a cyclic polysilane compound according to claim 6, wherein the solvent in the liquid mixture and the solvent for the silane monomer compound are the same solvent.

* * * * *